UNITED STATES PATENT OFFICE.

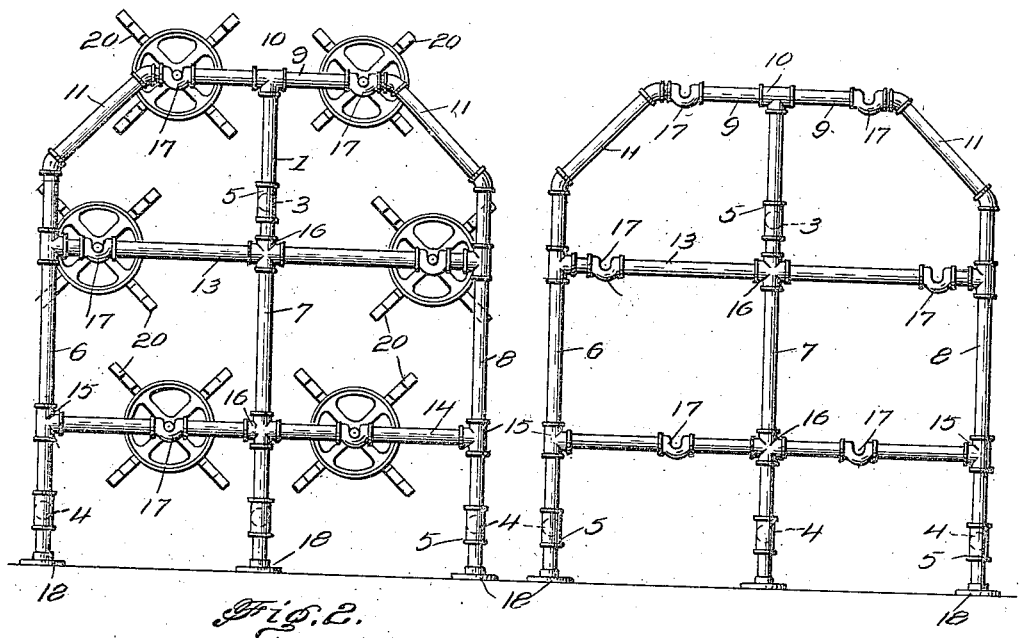

CHARLES P. SHOEMAKER, OF WILKES-BARRE, PENNSYLVANIA.

REEL-FLY RACK.

1,375,613.     Specification of Letters Patent.     Patented Apr. 19, 1921.

Application filed August 12, 1920. Serial No. 403,070.

*To all whom it may concern:*

Be it known that I, CHARLES P. SHOEMAKER, a citizen of the United States, residing at Wilkes-Barre, in the county of Luzerne and State of Pennsylvania, have invented certain new and useful Improvements in Reel-Fly Racks, of which the following is a specification.

This invention relates to a reel fly rack for use in silk mills to support the reel flies during the combing and lacing of the silk.

The object of the invention is to so construct such a rack that the silk on some of the flies supported thereby may be combed and laced while others are stored thereon, and which permits the replacement of full reel flies by empties and vice versa, thereby effecting economy in time, labor and expense and increasing production.

Another object is to prolong the life of the reel fly and prevent damage to the silk carried thereby.

Another object is to so construct such a rack that the reel flies supported thereby may be so placed that two of them may be employed for combing and lacing of the silk without interfering with the others and without necessitating retarding of the machinery.

With these and other objects in view, the invention consists in certain novel features of construction as hereinafter shown and described and then specifically pointed out in the claim and in the drawings illustrative of the preferred embodiment of the invention.

In the accompanying drawing:

Figure 1 represents an end elevation of a rack constructed in accordance with this invention with the filled reel flies shown mounted therein.

Fig. 2 is a side elevation thereof.

Fig. 3 is an end elevation with the flies shown removed, and,

Fig. 4 is a detail side elevation of one of the bearings for the flies.

In the embodiment illustrated the rack constituting this invention comprises two end members 1 and 2 connected by vertically spaced side bars or rails 3 and 4. These end members and side rails are preferably constructed of metal tubing although not necessarily so and the side rails are shown connected with the end members by T-couplings 5.

The end members are exactly alike and hence one only will be described in detail. Each of these members comprises laterally spaced uprights 6, 7 and 8, the central upright 7 being taller or higher than the others and carries at its upper end a cross bar 9 here shown connected therewith by a T-coupling 10. The ends of this cross bar 9 are attached to inclined bars 11 which connect with the upper ends of the uprights 6 and 8, couplings 12 being here shown connecting them.

Intermediate cross bars 13 and 14 connect the standards or uprights 6, 7 and 8 at points spaced from each other and are suitably connected with said standards, T-couplings 15 being shown for uniting these bars with the side standards 6 and 7 while four-way couplings 16 connect the bars with the central upright 7.

The cross bars 9, 13 and 14 have mounted therein longitudinally spaced bearings 17, the bearings in the uppermost bar 9 and the lowermost bar 14 being arranged in vertical alinement while those in the intermediate cross bar 13 are out of alinement with the others being arranged in planes at one side of that occupied by the bearings in the bars 9 and 14.

Flanged sockets or seats 18 are preferably carried by the lower ends of the standards 6, 7 and 8 for securing them to the floor if found desirable to do so.

The rack herein shown is designed to support six reel flies 20, the spindles 19 of which are designed to rest in the bearings 17, the arrangement of these bearings providing for the flies being used in pairs without interfering in any way with the others and which permit the replacement and removal of the flies when desired.

Racks constructed as above described and as shown in the accompanying drawing are designed for use especially in silk mills to hold the reel flies to protect the silk and also to permit it to be combed and laced.

Owing to the fact that four reel flies may be stored on the rack while the other two are being combed and laced, and empty reel flies can be positioned constantly while full reel flies are removed a considerable saving in time, labor and expense is effected. Moreover by providing suitable facilities for storage the life of the reel fly is prolonged and damage of the silk carried thereby prevented.

The preferred embodiment of the invention is disclosed in the drawings and set forth in the specification, but it will be understood that any modifications within the scope of the claim may be made in the construction without departing from the principle of the invention or sacrificing any of its advantages.

What I claim is:

A reel fly rack comprising connected end members, each composed of two outer and an intermediate upright, the latter being higher than the former, spaced cross bars connecting said uprights, and each having reel fly receiving bearings, the top cross bar being shorter than the others and inclined bars connecting the outer uprights with said top cross bar.

In testimony whereof, I affix my signature hereto.

CHARLES P. SHOEMAKER.